(12) United States Patent
Choi (10) Patent No.: US 10,149,130 B2
(45) Date of Patent: Dec. 4, 2018

(54) METHODS AND COMPUTER-READABLE MEDIUMS STORING COMPUTER PROGRAMS FOR NOTIFYING DATA RECEPTION

(71) Applicant: LINE Corporation, Tokyo (JP)

(72) Inventor: Won Joon Choi, Seongnam-si (KR)

(73) Assignee: Line Corporation, Tokyo (JP)

( * ) Notice: Subject to any disclaimer, the term of this patent is extended or adjusted under 35 U.S.C. 154(b) by 389 days.

(21) Appl. No.: 14/825,644

(22) Filed: Aug. 13, 2015

(65) Prior Publication Data

US 2016/0323363 A1 Nov. 3, 2016

(30) Foreign Application Priority Data

Apr. 30, 2015 (KR) .................. 10-2015-0061657

(51) Int. Cl.
*G06F 3/048* (2013.01)
*H04W 4/50* (2018.01)
*G06F 3/01* (2006.01)
*H04M 1/725* (2006.01)
*H04M 19/04* (2006.01)

(52) U.S. Cl.
CPC .............. *H04W 4/50* (2018.02); *G06F 3/013* (2013.01); *G06F 3/048* (2013.01); *H04M 1/72569* (2013.01); *H04M 19/04* (2013.01)

(58) Field of Classification Search
CPC ........... H04L 51/24; H04L 51/26; H04W 4/12
See application file for complete search history.

(56) References Cited

U.S. PATENT DOCUMENTS

| 2004/0128359 | A1* | 7/2004 | Horvitz | G05B 19/404 |
| | | | | 709/207 |
| 2009/0243819 | A1* | 10/2009 | Pala | B60K 35/00 |
| | | | | 340/425.5 |
| 2012/0278744 | A1* | 11/2012 | Kozitsyn | G06F 3/0481 |
| | | | | 715/764 |
| 2014/0335832 | A1 | 11/2014 | Yu et al. | |
| 2015/0061862 | A1 | 3/2015 | Lee et al. | |
| 2016/0070311 | A1* | 3/2016 | Geva | G06F 1/1694 |
| | | | | 345/592 |

FOREIGN PATENT DOCUMENTS

KR 1020140133679 11/2014
KR 1020150026651 3/2015

* cited by examiner

*Primary Examiner* — Claudia Dragoescu
(74) *Attorney, Agent, or Firm* — Harness, Dickey, & Pierce, P.L.C.

(57) ABSTRACT

A method of outputting notification of data reception in a device configured to transmit and receive data to and from an external device and a computer program recorded on a non-transitory computer-readable recording medium, which when executed by a processor, is configured to cause the device to perform the method are provided. The method includes receiving, by a processor of the device, data from the external device, determining, by the processor of the device, an importance of notification by recognizing at least one of a state of the device and surrounding circumstances of the device, and outputting, by the processor of the device, the notification of the data reception when the determined importance of the notification exceeds a first threshold value.

14 Claims, 6 Drawing Sheets

METHODS AND COMPUTER-READABLE MEDIUMS STORING COMPUTER PROGRAMS FOR NOTIFYING DATA RECEPTION

CROSS-REFERENCE TO RELATED APPLICATION

This application claims the benefit of Korean Patent Application No. 10-2015-0061657, filed on Apr. 30, 2015, in the Korean Intellectual Property Office, the disclosure of which is incorporated herein in its entirety by reference.

BACKGROUND

1. Field

One or more example embodiments relate to methods and/or non-transitory computer-readable mediums storing computer programs for notifying data reception. More particularly, one or more example embodiments relate to methods of notifying data reception of a device, which have received data (e.g., text messages, photographs, etc.) from an external environment, and/or non-transitory computer-readable media storing computer programs, which is capable of performing the methods.

2. Description of the Related Art

As electronic communication technology advances, users can perform various functions using a device, which is capable of performing electronic communication. The term "device" may mean a personal computer (PC) or a portable terminal (e.g., portable handheld devices). Users may install and/or uninstall various programs in the device, and/or directly connecting the device to a communication network via, for example, a wireless Internet. Accordingly, transmitting and/or receiving data (e.g., text messages, photographs, etc.) to and from an external device via the communication network become possible.

However, since the user of the device does not always watch or check the device, notifying the user of data reception of the device when the device has received data provided from the external device. Thus, it is desired to output notifications in different methods, types, or frequencies according to a user's current condition, a device's current state, and/or a relationship with an external device, which has transmitted the data.

SUMMARY

One or more example embodiments include methods and/or non-transitory computer-readable mediums storing computer program for notifying data reception from a device, which have received data when data is transmitted and received between devices.

One or more example embodiments include methods and/or non-transitory computer-readable mediums storing computer program for notifying data reception. The methods and/or the computer program stored in the non-transitory computer-readable mediums may determine an importance of notification of the data reception, may take into consideration a device itself having received data or surrounding circumstances of the corresponding device when the data is transmitted and received between the devices, and may determine whether to output the notification of the data reception, an output method, or the like according to the determined importance of the notification.

One or more example embodiments include methods and/or non-transitory computer-readable mediums storing computer program for notifying data reception. According to these example embodiments, The methods and/or the computer program stored in the non-transitory computer-readable mediums may determine an importance of notification of the data reception, may take into consideration data or a state of a device having transmitted the corresponding data, surrounding circumstances of the corresponding device when the data is transmitted and received between the devices, and may determine whether to output the notification of the data reception, an output method, or the like according to the determined importance of the notification.

Additional aspects will be set forth in part in the description which follows and, in part, will be apparent from the description, or may be learned by practice of the presented example embodiments.

According to an example embodiment, a method of outputting notification of data reception in a device, which is configured to transmit and receive data to and from an external device, includes receiving, by a processor of the device, data from the external device, determining, by the processor of the device, an importance of notification by recognizing at least one of a state of the device and surrounding circumstances of the device, and outputting, by the processor of the device, the notification of the data reception when the determined importance of the notification exceeds a first threshold value.

The determining of the importance of the notification may include detecting a user's input to the device and determining the importance of the notification taking into consideration a type of the detected input. The type of the detected input may include at least one selected from among an input of checking the notification and disabling a display of the device, an input of disabling a sound output of the device, an input of disabling a vibration of the device, and an input of initializing the device.

The importance of the notification may be determined based on the user's input to the processor of the device that is detected while the device is in a locked state, and the locked state may be a state in which the device is disabled for at least one of receivable inputs.

The determining of the importance of the notification may include determining a basic importance of the data based on the data and the external device having transmitted the data, recognizing at least one of a state of the device and surrounding circumstances of the device, and determining the importance of the notification by correcting the basic importance based on the recognized state of the device and/or the recognized surrounding circumstances of the device.

The basic importance may be determined based on at least one selected from a time elapsed after a recent data reception from the external device, an average elapsed time from a time point of a data reception from the external device to a time point of a data transmission to the external device, whether data is transmitted and received between the device and the external device during a first reference period, and a ratio of a number of data transmissions to the external device with respect to a number of data transmissions/receptions to/from the external device.

The determining of the importance of the notification may include measuring illuminance around the device, and determining that the importance of the notification is higher as the measured illuminance becomes lower.

The determining of the importance of the notification may include measuring a degree of shaking of the device, and determining that the importance of the notification is higher as the measured degree of shaking becomes higher.

The determining of the importance of the notification may include checking whether the user watches the device, and determining that the importance of the notification is lower when the user watches the device.

The outputting of the notification may include determining at least one type of the notification to be output according to whether the determined importance of the notification exceeds a second threshold value, and outputting the determined type of the notification. The type of the notification may include at least one selected from a notification via a sound, a notification via a vibration, and a notification using a method of displaying a visual sign on an entirety of or a portion of a display region of the device.

The outputting of the notification may include increasing at least one of an output strength of the notification, an output frequency of the notification, and a display region of the notification in proportion to the determined importance of the notification.

According to an example embodiment, a method of outputting notification of reception of data, which is transmitted and received between first and second devices through a server which is configured to store, transmit and/or receive the data, may include transmitting, by a processor of the server, data from the second device to the first device, determining, by the processor of the server, an importance of notification based on information about at least one of a state of the first device and surrounding circumstances of the first device, and transmitting, by the processor of the server, a signal instructing the first device to output the notification of the data reception when the determined importance of the notification exceeds a first threshold value.

The importance of the notification may be determined taking into consideration a type of a user input detected by the first device, the type of the detected user input includes at least one selected from among an input of checking the notification and disabling a display of the first device, an input of disabling a sound output of the first device, an input of disabling a vibration of the first device, an input of initializing the first device, an input of changing the first device to a locked state, and an input of checking the notification when the first device is in the locked state, and the locked state is a state in which the first device is disabled for at least one of receivable inputs.

The determining of the importance of the notification may include determining a basic importance of the data based on the data and the second device having transmitted the data, and receiving, from the first device, information about at least one of a state of the first device and surrounding circumstances of the first device, and determining the importance of the notification by correcting the basic importance based on the received state of the first device and/or the received surrounding circumstances of the first device.

The determining of the importance of the notification may include receiving, from the first device, information about at least one of illuminance around the first device and a degree of shaking of the first device, and determining that the importance of the notification is higher as the illuminance around the first device is lower or when the degree of shaking of the first device is higher.

The determining of the importance of the notification may include receiving, from the first device, information about whether a user of the first device watches the first device, and determining that the importance of the notification is lower when the user of the first device watches the first device.

The transmitting of the signal to the first device may include determining at least one type of the notification to be output, according to whether the determined importance of the notification exceeds a second threshold value, and transmitting a signal instructing the first device to output the determined type of the notification. The type of the notification may include at least one selected from a notification via a sound, a notification via a vibration, and a notification using a method of displaying a visual sign on an entirety of or a portion of a display region of the first device.

The transmitting a signal to the first device may include adjusting a notification output signal transmitted to the first device such that at least one of an output strength of the notification, an output frequency of the notification, and a display region of the notification in proportion to the determined importance of the notification is adjusted.

The transmitting a signal to the first device may include adjusting a notification output signal transmitted to the first device such that at least one of an output strength of the notification, an output frequency of the notification, and a display region of the notification in proportion to a time elapsed from a start time of the notification is adjusted.

According to an example embodiment, a non-transitory computer-readable recording medium storing a computer program, which, when executed by a computer, is configured to cause the device to perform the aforementioned methods may be provided.

Such general and specific aspects of the inventive concepts may be performed using a system, a method, a computer program, or a combination thereof.

Other aspects, features, and advantages of the inventive concepts will be apparent from the following detailed description and claims, taken in conduction with the accompanying drawings.

BRIEF DESCRIPTION OF THE DRAWINGS

These and/or other aspects of the inventive concepts will become apparent and more readily appreciated from the following description of the example embodiments, taken in conjunction with the accompanying drawings in which.

DETAILED DESCRIPTION

Reference will now be made in detail to some example embodiments, examples of which are illustrated in the accompanying drawings, wherein like reference numerals refer to like elements throughout. In this regard, the present example embodiments may have different forms and should not be construed as being limited to the descriptions set forth herein. Accordingly, the example embodiments are merely described below, by referring to the figures, to explain aspects of the present description. Expressions such as "at least one of," when preceding a list of elements, modify the entire list of elements and do not modify the individual elements of the list. As used herein, the term "and/or" includes any and all combinations of one or more of the associated listed items. The inventive concepts may be embodied in many different forms and realized in various example embodiments, and example embodiments will be illustrated in the drawings and specifically described in the present disclosure. Advantages and features of the inventive concepts and methods of achieving them will be apparent from the example embodiments set forth herein together with the drawings. However, the inventive concepts should not be construed as being limited to the example embodiments set forth herein and may have different forms.

As used herein, the singular forms "a", "an" and "the" are intended to include the plural forms as well, unless the context clearly indicates otherwise. It will be further understood that the terms "comprises" and/or "comprising," when used in this specification, specify the presence of stated features or elements, but do not preclude the presence or addition of one or more other features or elements. In the drawings, lengths and sizes of layers and regions may be exaggerated for clarity. For example, the sizes and thicknesses of the elements illustrated in the drawings are arbitrarily shown and thus the inventive concepts are not limited thereto.

It will be understood that when an element or a layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of example embodiments.

Meanwhile, when it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Example embodiments disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits and/or microprocessors.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

Hereinafter, some example embodiments of the inventive concepts will be described in detail with reference to the accompanying drawings.

Figure 1:
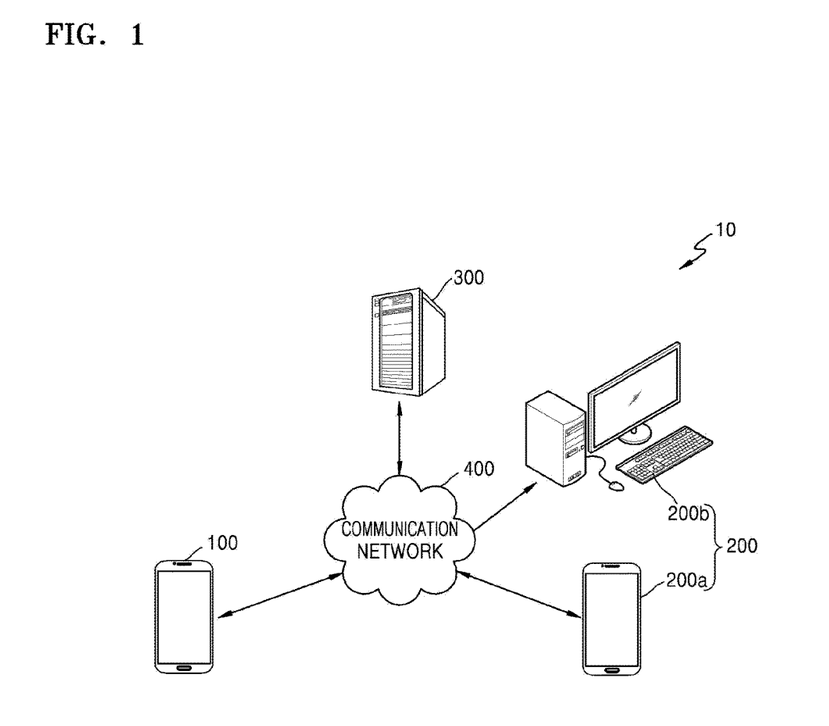
FIG. 1 is a diagram illustrating a configuration of a data transmission/reception system according to an example embodiment.

FIG. 1 is a diagram illustrating a configuration of a data transmission/reception system 10 according to an example embodiment.

Referring to FIG. 1, the data transmission/reception system 10 according to the example embodiment may include a first data transmission/reception device 100 and one or more second data transmission/reception devices 200. The data transmission/reception system 10 may further include a server 300, which receives data from the first data transmission/reception device 100 and the second data transmission/reception devices 200, stores the received data, and transmits the data to the first data transmission/reception device 100 and the second data transmission/reception devices 200. Further, the data transmission/reception system 10 may include a communication network 400, which is configured to enable communication between the first data transmission/reception device 100, the second data transmission/reception devices 200, and the server 300.

Each of the first data transmission/reception device 100 and the second data transmission/reception devices 200 may be a device that transmits and receives data in the data transmission/reception system 10 according to the example embodiment. Each of the first data transmission/reception device 100 and the second data transmission/reception devices 200 may be an electronic device that is capable of transmitting and receiving data to and from other devices in a wired/wireless communication environment.

The term "data" used herein may mean data that is capable of being transmitted and received between electronic devices through electricity, radio waves, other electronic materials, or a difference of physical quantity in a wired/wireless communication environment. For example, the data may include a text message, a picture, a photograph, a video, an electronic document, and/or an electronic signal.

Each of the first data transmission/reception device 100 and the second data transmission/reception devices 200 may be implemented with a single device. The first data transmission/reception device 100 and one of the second data transmission/reception devices 200 may be two physically independent data transmission/reception devices. For example, the first data transmission/reception device 100 and a $2a^{th}$ data transmission/reception device 200a may be treated as different data transmission/reception devices. According to some example embodiments, the identity of the data transmission/reception devices may be determined according to the identity of accounts logged in to the devices. For example, the $2a^{th}$ data transmission/reception device 200a logged in with a first account and a $2b^{th}$ data transmission/reception device 200b logged in with the first account may be treated as the same data transmission/reception device.

Further, the first data transmission/reception device 100 may transmit and/or receive data to and from a plurality of external data transmission/reception devices.

In FIG. 1, each of the first data transmission/reception device 100 and the second data transmission/reception devices 200 is illustrated as a smart phone or a personal computer, but the inventive concepts are not limited thereto. Any electronic devices may be used as the first data transmission/reception device 100 and the second data transmission/reception devices 200 as long as the electronic devices are capable of transmitting and receiving data to and from other devices in the wired/wireless communication environment as described above.

More specifically, the first data transmission/reception device 100 and the second data transmission/reception devices 200 may be, for example, desktop computers, tablet PCs, smart TVs, mobile phones, personal digital assistants (PDAs), laptop computers, media players, micro servers, global positioning system (GPS) devices, e-book terminals, digital broadcasting terminals, navigations, kiosk, MP3 players, digital cameras, wearable devices, and other mobile or non-mobile computing devices, but the inventive concepts are not limited thereto.

Further, the first data transmission/reception device 100 and the second data transmission/reception devices 200 may include various devices, such as electronic bulletin boards or touch tables, which are capable of receiving a touch input. Furthermore, the first data transmission/reception device 100 and the second data transmission/reception devices 200 may be electronic accessories (e.g., a watch, glasses, a hair band, and a ring), which have a communication function and a data processing function, but the inventive concepts are not limited thereto.

The first data transmission/reception device 100 may transmit and receive data to and from the second data transmission/reception devices 200. For example, the first data transmission/reception device 100 may exchange data with the second data transmission/reception devices 200, and the first data transmission/reception device 100 may display data indicating conversations between users on a display unit thereof. Further, the second data transmission/reception devices 200 may display data indicating conversations between users on display units thereof.

The server 300 may be a server configured to provide a data transmission/reception service. Although only one server 300 is illustrated in FIG. 1, a plurality of servers may be present according to, for example, traffics or data quantity. The server 300 may store data transmitted and received between the first data transmission/reception device 100 and the second data transmission/reception device 200. The server 300 may receive data from any one of the first data transmission/reception device 100 and the second data transmission/reception device 200 and provide the received data with the first data transmission/reception device 100, the second data transmission/reception device 200, and/or at least one of other data transmission/reception devices included in the data transmission/reception system 10. The server 300 may selectively provide the data with devices to which the first data transmission/reception device 100 or the second data transmission/reception devices 200 has provided a data request, which is a request asking for the data.

Besides the data transmission/reception service, the server 300 may provide a general search service and/or various other services for improving user convenience. For example, besides the data transmission/reception service, the server 300 may provide various services, for example, a search service, an email service, a blogging service, a social network service, a news service, and/or a shopping information providing service.

The server 300 may be connected to a server providing a portal service, which provides one or more services (e.g., a search service, an email service, a news service, and a shopping service), and/or a webpage, and/or may be connected to the first data transmission/reception device 100 that requests the portal service to provide information (e.g., data). The server 300 and the portal service providing server may be separate servers that are physically separated from each other, or may be the same server that is just virtually or conceptually divided.

FIG. 1 illustrates that the first data transmission/reception device 100 transmit and receive data to and from the second data transmission/reception device 200 via the communication network 400, but the data transmission and reception between the first data transmission/reception device 100 and the second data transmission/reception devices 200 may be performed through the server 300. For example, the first data transmission/reception device 100 may transmit the data in the form of electronic signals to the server 300 via the communication network 400, and then, the server 300 may transmit the data to the second data transmission/reception device 200 via the communication network 400.

The communication network 400 may be configured to connect the first data transmission/reception device 100 and the server 300. Further, the communication network 400 may be configured to connect the first data transmission/reception device 100 and the second data transmission/reception devices 200 to the server 300. Furthermore, the communication network 400 may be configured to enable data exchange between the first data transmission/reception device 100 and the second data transmission/reception device 200. For example, the communication network 400 may be configured to provide a data communication path, which allows data, including the data between the first data transmission/reception device 100 and the second data transmission/reception device 200, to be transmitted and received through the server 300. Examples of the communication network 400 may include a wired network, such as local area networks (LANs), wide area networks (WANs), metropolitan area networks (MANs), or integrated service digital networks (ISDNs), and a wireless network, such as wireless LANs, code division multiple access (CDMA), Bluetooth, or satellite communications. However, the inventive concepts are not limited thereto.

Figure 2:
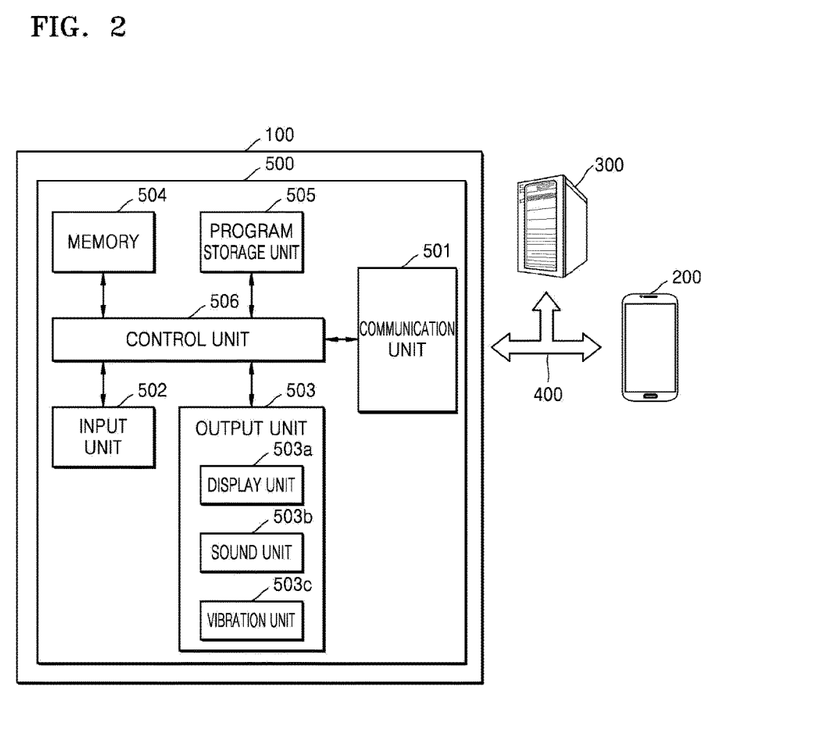
FIGS. 2 and 3 are block diagrams illustrating the internal configuration of the data transmission/reception system of FIG. 1.
Figure 3:
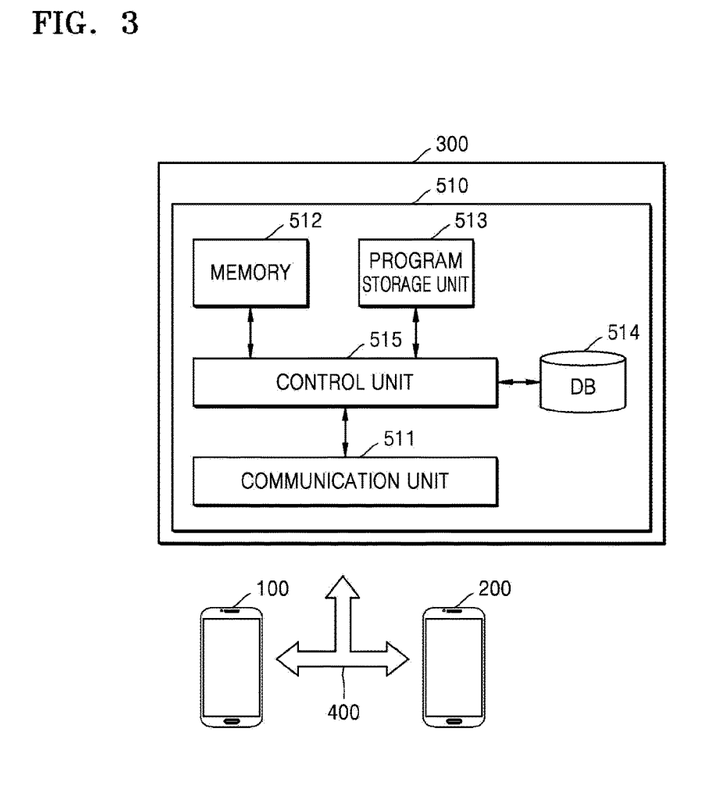

FIGS. 2 and 3 are block diagrams illustrating the internal configuration of the data transmission/reception system 10 of FIG. 1.

Referring to FIG. 2, the data transmission/reception system 10 according to some example embodiments may include the first data transmission/reception device 100, the second data transmission/reception device 200, and the server 300. The first data transmission/reception device 100 may include a data reception notification device 500. The data reception notification device 500 may include a communication unit (or circuitry) 501, an input unit (or circuitry) 502, an output unit (or circuitry) 503, a memory 504, a program storage unit 505, and a control unit (or circuitry) 506. The output unit 503 may include a display unit 503a, a sound unit 503b, and a vibration unit 503c.

The data reception notification device 500 may be included in the first data transmission/reception device 100. For example, the data reception notification device 500 may be hardware (e.g., hard-wired control circuitry) mounted inside or outside the first data transmission/reception device 100 and connected to the first data transmission/reception device 100, or may be hardware on which software for executing, for example, a chat service function is installed. For example, the first data transmission/reception device 100 itself, on which software (e.g., an application) for executing a search service is installed, may be the data reception notification device 500.

Besides the first data transmission/reception device 100, the data reception notification device 500 may be included in the second data transmission/reception device 200 or may be included in at least some of the data transmission/reception devices in the data transmission/reception system 10. The following description will be provided focusing on the data reception notification device 500 included in the first data transmission/reception device 100.

The communication unit 501 may transmit and receive data to and from an external device. For example, the communication unit 501 may perform wired/wireless communication with the second data transmission/reception device 200 or the server 300 via the communication network 400. The communication unit 501 may transmit and receive data to and from the second data transmission/reception device 200 or the server 300 via the communication network 400. The communication unit 501 may be a Bluetooth communication unit, a Bluetooth low energy (BLE) communication unit, a near field communication (NFC) unit, a wireless local access network (WLAN) (Wi-Fi) communication unit, a Zigbee communication unit, an infrared data association (IrDA) communication unit, a Wi-Fi direction (WFD) communication unit, an ultra wideband (UWB) communication unit, or an Ant+ communication unit, but the inventive concepts are not limited thereto.

The communication unit 501 may be included in an element that performs wired/wireless communication with an external electronic device in of the first data transmission/reception device 100. In some example embodiments, the corresponding element itself of the first data transmission/reception device 100 may be the communication unit 501 of the data reception notification device 500.

When the data is received, the input unit 520 may receive a user input. The input unit 502 may receive a user input for transmitting and receiving the data. For example, the input unit 502 may receive a user's voice input, a user's text input, or a user's touch input, but the inventive concepts are not limited thereto. The input unit 502 may form a layer structure with the display unit 503a to thereby constitute a single touch screen. In this case, the display unit 503a and the input unit 502 may be a device having a single integrated physical configuration.

The input unit 502 may be included in an element that receives a user input in the first data transmission/reception device 100. For example, the corresponding element itself of the first data transmission/reception device 100 may be the input unit 502 of the data reception notification device 500.

The output unit 503 may output the notification of the data reception. For example, the output unit 503 may output the notification of the data reception in various forms. The output unit 503 may include at least one of the display unit 503a, the sound unit 503b, and the vibration unit 503c so as to output the notification of the data reception in various forms.

The display unit 503a may output the notification of the data reception in a visual form. For example, the display unit 503a may display a user interface (UI) indicating the notification of the data reception in at least a portion of the display unit 503a. At least one selected from among a data sender, a data type, contents of at least a part of the data, and a data reception time may be displayed on the UI.

The display unit 503a may include at least one selected from among a liquid crystal display (LCD), a thin-film transistor-liquid crystal display (TFT-LCD), an organic light-emitting diode (OLED), a flexible display, a three-dimensional (3D) display, and an electrophoretic display, but the inventive concepts are not limited thereto. According to the implementation type of the data reception notification device 500, the data reception notification device 500 may include two or more display units 503a.

The display unit 503a may be included in an element that displays information processed by the first data transmission/reception device 100. For example, the corresponding element itself of the first data transmission/reception device 100 may be the display unit 503a of the data reception notification device 500.

The sound unit 503b may output the notification of the data reception in an auditory form. For example, the sound unit 503b may output a sound indicating the notification of the data reception through a speaker. The sound unit 503b may output sounds having different lengths, strengths, pitches, or tones according to at least one of a data sender, a data type, contents of at least a part of the data, and a data reception time.

The sound unit 503b may include at least one selected from among a tuner, an equalizer, a headphone, an earphone, and various types of speakers, but the inventive concepts are not limited thereto. That is, the sound unit 503b may be various types of devices capable of generating a sound by using an electrical or mechanical method.

The sound unit 503b may be included in an element that generates a sound in the first data transmission/reception device 100. For example, the corresponding element itself of the first data transmission/reception device 100 may be the sound unit 503b of the data reception notification device 500.

The vibration unit 503c may output the notification of the data reception in a haptic form. For example, the vibration unit 503c may output the notification of the data reception by vibrating at least a portion of the data reception notification device 500 or the vibration unit 503c itself. The vibration unit 503c may output vibrations having different lengths, strengths, or patterns according to at least one of a data sender, a data type, contents of at least a part of the data, and a data reception time.

The vibration unit 503c may be a vibration motor or a vibration film, but the inventive concepts are not limited thereto. For example, the vibration unit 503c may be various types of devices capable of generating a vibration by using an electrical or mechanical method. In some example embodiments, the vibration unit 503c may be a device that generates various types of haptic effects (e.g., a stinging effect, a pressing effect, a minute current flow effect, etc.), instead of the vibrating effect.

The vibration unit 503c may be included in an element that generates a vibration in the first data transmission/reception device 100. For example, the corresponding element itself of the first data transmission/reception device 100 may be the vibration unit 503c of the data reception notification device 500.

The memory 504 may temporarily or permanently store data processed by the control unit 506. The memory 504 may include a magnetic storage media, or a flash storage media, but the inventive concepts are not limited thereto. The memory 504 may store data transmitted and received to and from the second data transmission/reception device 200 or the server 300.

The memory 504 may be included in an element that temporarily or permanently stores data processed by the first data transmission/reception device 100. For example, the corresponding element itself of the first data transmission/reception device 100 may be the memory 504 of the data reception notification device 500.

The program storage unit 505 may be an element for mounting software that executes various primary or auxiliary operations during the transmission and reception of the data.

The program storage unit 505 may be included in an element of the first data transmission/reception device 100 for mounting the software that executes various primary or auxiliary operations so as to drive the first data transmission/reception device 100. For example, the corresponding element itself of the first data transmission/reception device 100 may be the program storage unit 505 of the data reception notification device 500.

The control unit 506 may control the overall operation of the data reception notification device 500. For example, the control unit 506 may control the overall operation of the communication unit 501, the input unit 502, the output unit 503, the memory 504, or other elements of the data reception notification device 500 by executing the software stored in the program storage unit 505 of the data reception notification device 500.

The control unit 506 may include any type of devices capable of processing data, for example, a processor. The term "processor" used herein may mean a data processing device that is embedded in hardware and includes a physically structured circuit for executing program codes or functions expressed as commands. Examples of the data processing devices embedded in the hardware may include a microprocessor, a central processing unit (CPU), a processor core, a multiprocessor, an application specific integrated circuit (ASIC), and a field programmable gate array (FPGA), but the inventive concepts are not limited thereto.

The control unit 506 may be included in an element of the first data transmission/reception device 100 that controls the overall operation of the first data transmission/reception device 100. For example, the corresponding element itself of the first data transmission/reception device 100 may be the control unit 506 of the data reception notification device 500.

When the first data transmission/reception device 100 receives data, the control unit 506 may control the output unit 503 to output the notification of the data reception. For example, the control unit 506 may determine the importance of the notification of the data reception, and may determine whether to output the notification of the data reception, an output method, an output strength, or an output frequency, based on the importance of the notification.

The control unit 506 may recognize at least one of a state of the first data transmission/reception device 100 itself and surrounding circumstances of the first data transmission/reception device 100 and determine the importance of the notification.

For example, the control unit 506 may determine the importance of the notification based on a user input to the first data transmission/reception device 100. For example, the control unit 506 may detect a user action of inputting a specific command to the first data transmission/reception device 100. For example, the input action may be at least one of an action of touching the first data transmission/reception device 100, an action of pressing or moving a specific button on the first data transmission/reception device 100, and/or an action of speaking a command in a voice, but the inventive concepts are not limited thereto. The control unit 506 may confirm a type of a command corresponding to the detected user input. The type of the command may include at least one selected from among an input of checking the notification and disabling the display unit 503a of the first data transmission/reception device 100, an input of disabling the sound output of the first data transmission/reception device 100, an input of disabling the vibration of the first data transmission/reception device 100, and an input of initializing the first data transmission/reception device 100, but the inventive concepts are not limited thereto. When the control unit 506 detects the user input, the control unit 506 may determine that the importance of the notification is low, taking into consideration the user input. For example, the control unit 506 may determine the importance of the notification, taking into consideration whether the first data transmission/reception device 100 is in a locked state. In some example embodiments, even when the first data transmission/reception device 100 is in the locked state, the control unit 506 may detect a user input and determine the importance of the notification based on the corresponding user input. When the user is highly likely to recognize the data reception, the control unit 506 may not output a notification of the data reception or may transfer a relatively slight notification to the user.

In some example embodiments, the control unit 506 may determine the importance of the notification based on illuminance around the first data transmission/reception device 100. For example, the control unit 506 may measure the illuminance around the first data transmission/reception device 100 by using an illumination sensor included in the control unit 506, the data reception notification device 500, or the first data transmission/reception device 100. Then, the control unit 506 may determine that the importance of the notification is higher as the measured illuminance becomes lower. Therefore, when the first data transmission/reception device 100 is in a user's bag or pocket, the control unit 506 may transfer a relatively strong notification to the user.

In some other example embodiments, the control unit 506 may determine the importance of the notification based on the degree of shaking of the first data transmission/reception device 100. For example, the control unit 506 may measure the degree of shaking of the first data transmission/reception device 100 by using an acceleration senor or a gyro sensor, which is included in the control unit 506, the data reception notification device 500, or the first data transmission/reception device 100. In this case, the control unit 506 may determine that the importance of the notification is higher as the measured degree of shaking becomes higher. Therefore, when the user holding the first data transmission/reception device 100 is moving, the control unit 506 may transfer a relatively strong notification to the user.

In some other example embodiments, the control unit 506 may determine the importance of the notification based on whether the user watches the first data transmission/reception device 100. For example, the control unit 506 may check whether the user watches the first data transmission/reception device 100 by using an eye tracking sensor included in the control unit 506, the data reception notification device 500, or the first data transmission/reception device 100. The control unit 506 may determine that the importance of the notification is higher when the user does not watch the first data transmission/reception device 100 than when the user watches the first data transmission/reception device 100. Therefore, when the user does not watch the first data transmission/reception device 100, the control unit 506 may transfer a relatively strong notification to the user.

Further, the control unit 506 may determine the importance of the notification, taking into consideration at least one of characteristics of the received data itself and the second data transmission/reception device 200 that have transmitted the corresponding data.

For example, the control unit 506 may determine the importance of the notification based on the type of the received data. For example, the type of the data may include a text message, a picture, a photograph, a video, or an electronic document. As compared to a simple text message, the picture or the photograph may contain more important information. In some example embodiments, the user of the first data transmission/reception device 100 may directly set the importance of the notification. For example, the control unit 506 may determine the importance of the notification according to an importance between types of data, which is determined by the user, and/or according to an importance between types of data, which is automatically determined. The control unit 506 may determine a basic importance of the data based on the type of the data itself and/or the second data transmission/reception device 200 that have transmitted the data. The control unit 506 may determine the importance of the notification by correcting the basic importance, taking into consideration the state of the first data transmission/reception device 100. Accordingly, when a relatively important type of data is received, the control unit 506 may transfer a relatively strong notification to the user.

In some example embodiments, the control unit 506 may determine the importance of the notification based on at least one selected from a time elapsed after a recent data reception from the second data transmission/reception device 200, an average elapsed time from a time point of a data reception from the second data transmission/reception device 200 to a time point of a data transmission to the second data transmission/reception device 200, whether data is transmitted and received between the first data transmission/reception device 100 and the second data transmission/reception device 200 during a first reference period, and a ratio of the number of data transmissions to the second data transmission/reception device 200 with respect to the number of data transmissions/receptions to/from the second data transmission/reception device 200. For example, the above-listed matters may be a criterion for measuring the frequency of data transmissions/receptions between the first data transmission/reception device 100 and the second data transmission/reception device 200 and/or the data transmission/reception activeness of the first data transmission/reception device 100 with respect to the data transmission/reception to/from the second data transmission/reception device 200. Accordingly, the control unit 506 may evaluate an importance or an intimacy of a relationship between the user of the first data transmission/reception device 100 and the user of the second data transmission/reception device 200, and determine the importance of the notification based on an evaluation result. Therefore, the control unit 506 may determine the importance of the notification based on the relationship to a data sender. Thus, when the importance of the relationship to the data sender is high, the control unit 506 may perform a control operation to transfer a relatively strong notification of the data reception.

When the importance of the notification is equal to or higher than a desired (or alternatively, predetermined) level, the control unit 506 may output the notification of the data reception. For example, when the importance of the notification of the data reception time point exceeds a first threshold value, the control unit 506 may output the notification of the data reception.

Further, when the importance of the notification of the data reception is higher, the control unit 506 may control the output unit 503 to output the notification with a higher strength, output the notification more frequently, and/or output the notification by using more diversified methods.

For example, the control unit 506 may check whether the importance of the notification exceeds one or more threshold values and determine the type of the notification to be output, based on the checking result. For example, the first data transmission/reception device 100 may output the notification by using a method of displaying a UI indicating the notification of the data reception, a method of outputting a sound indicating the notification of the data reception, and/or a method of generating a vibration indicating the notification of the data reception. For example, when the importance of the notification is equal to or less than a second threshold value, the control unit 506 may control the output unit 503 to display a UI indicting the notification of the data on the display unit 503a. When the importance of the notification is greater than the second threshold value and equal to or less than a third threshold value, the control unit 506 may control the output unit 503 so that the vibration indicting the notification of the data reception is generated while the UI indicting the notification of the data is displayed on the display unit 503a. When the importance of the notification exceeds a third threshold value, the control unit 506 may control the output unit 503 to output the three types of the notification, that is, the display of the UI, the generation of the vibration, and the output of the notification sound. For example, the control unit 506 may control the output unit 503 to output some of the display of the UI, the generation of the vibration, and the output of the notification sound. Furthermore, the control unit 506 may control the output unit 503 to change the output strength of the notification or the output frequency of the notification according to the importance of the notification. For example, when the importance of the notification is higher, the control unit 506 may control the output unit 503 to generate a stronger vibration, output a louder notification sound, and/or output the notification more frequently. Therefore, the control unit 506 may transfer an appropriate notification to the user according to a situation (e.g., according to the importance of the notification) by adjusting, for example, the type of the notification, the output strength of the notification, and/or the output frequency of the notification.

Further, the control unit 506 may control the output unit 503 to adjust the type of the notification, the output strength of the notification, or the output frequency of the notification according to the passage of time from the time point of the output of the notification. For example, in a case where the user does not make a corresponding action even after the notification is output, the control unit 506 may allow the user to recognize the notification by gradually increasing the output strength of the notification and/or the output frequency of the notification. For example, in a case where the user does not make a corresponding action even after the notification is output, the control unit 506 may determine that the user cannot manipulate the first data transmission/reception device 100, and may not output the notification of the data reception any more.

As described above, the data reception notification device 500 according to the example embodiment of the present inventive concepts may be included in the first data transmission/reception device 100. According to some example embodiments, the server 300 may include a data reception notification device.

Referring to FIG. 3, the server 300 may include a data reception notification device 510. In this case, the data reception notification device 510 may include a communication unit 511, a memory 512, a program storage unit 513, a database 514, and a control unit 515.

Descriptions about elements of the data reception notification device 510, which perform the same operations as those included in the data reception notification device 500 of FIG. 2, will be omitted. The following description will be provided focusing on elements of the data reception notification device 510, which performs different operations from those included in the data reception notification device 500 of FIG. 2.

The data reception notification device 510 may be included in the server 300. The data reception notification device 510 may be hardware mounted inside or outside the server 300 and connected to the server 300, or may be hardware on which software for executing a chat service function is installed. For example, the server 300 may be the data reception notification device 510.

The communication unit 511 may transmit and receive data to and from the first data transmission/reception device 100 and the second data transmission/reception device 200 by using wired/wireless communication via the communication network 400. Further, the communication unit 511 may transmit a signal instructing the first data transmission/reception device 100 or the second data transmission/reception device 200 to output the notification of the data reception via the communication network 400. Further, the communication unit 511 may transmit a signal including information about the importance of the notification to the first data transmission/reception device 100 or the second data transmission/reception device 200 via the communication network 400. The communication unit 511 may be included in an element that performs wired/wireless communication with an external electronic device in the server 300. For example, the corresponding element itself of the server 300 may be the communication unit 511 of the data reception notification device 510.

The memory 512 may temporarily or permanently store data processed by the control unit 515. The memory 512 may be included in an element that temporarily or permanently stores the data processed by the server 300. For example, the corresponding element itself of the server 300 may be the memory 512 of the data reception notification device 510.

The program storage unit 513 may be an element that allows the first data transmission/reception device 100 and the second data transmission/reception device 200 to transmit and receive data and is mounted with software for executing various primary or auxiliary operations in the process of storing the corresponding data. The program storage unit 513 may be included in an element of the server 300 for mounting the software that executes various primary or auxiliary operations so as to drive the server 300. For example, the corresponding element itself of the server 300 may be the program storage unit 513 of the data reception notification device 510.

The database 514 may store information about the data transmitted and received by the first data transmission/reception device 100, the second data transmission/reception device 200, or the server 300. The database 514 may be included in an element that stores and manages various data in the server 300. For example, the corresponding element itself of the server 300 may be the database 514 of the data reception notification device 510.

The control unit 515 may control the overall operation of the data reception notification device 510. For example, the control unit 506 may control the overall operations of the communication unit 511, the memory 512, the database 514, and other elements of the data reception notification device 510 by executing the software stored in the program storage unit 513 of the data reception notification device 510. The control unit 515 may be included in an element of the server 300 that controls the overall operation of the server 300. For example, the corresponding element itself of the server 300 may be the control unit 515 of the data reception notification device 510.

The control unit 515 may determine the importance of the notification from information about at least one of a state of the first data transmission/reception device 100, a state of the second data transmission/reception device 200, surrounding circumstances of the first data transmission/reception device 100, and surrounding circumstances of the second data transmission/reception device 200. The control unit 515 may determine the importance of the notification based on, for example, illuminance around the devices, the degree of shaking of the devices, a relationship between the devices, and/or whether the user watches the devices. For example, information about the devices may be received from the corresponding devices.

The control unit 515 may determine the importance of the notification based on a type of an input from the user of the first data transmission/reception device 100 or a type of an input from the user of the second data transmission/reception device 200. For example, information about the type of the input from the users of the devices may be received from the corresponding devices.

The control unit 515 may control the communication unit 511 to transmit a signal instructing the first data transmission/reception device 100 or the second data transmission/reception device 200 to output the notification of the data reception, based on the determined importance of the notification. For example, the control unit 515 may control the communication unit 511 to transmit a signal including the information about the determined importance of the notification to the first data transmission/reception device 100 or the second data transmission/reception device 200.

Figure 4:
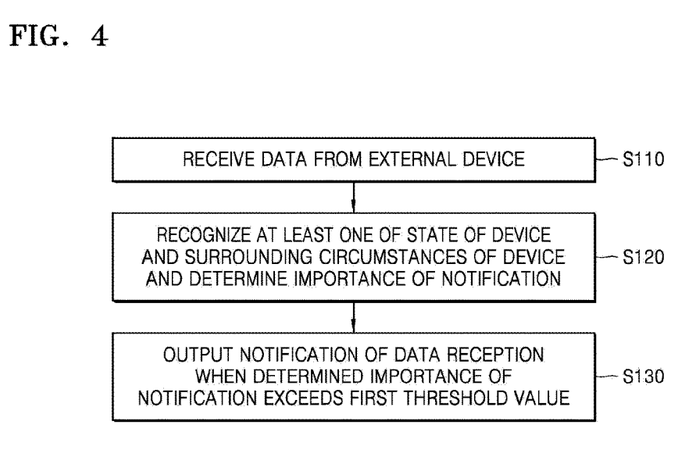
FIGS. 4 and 5 are flowcharts of methods of notifying data reception, according to some example embodiments.
Figure 5:
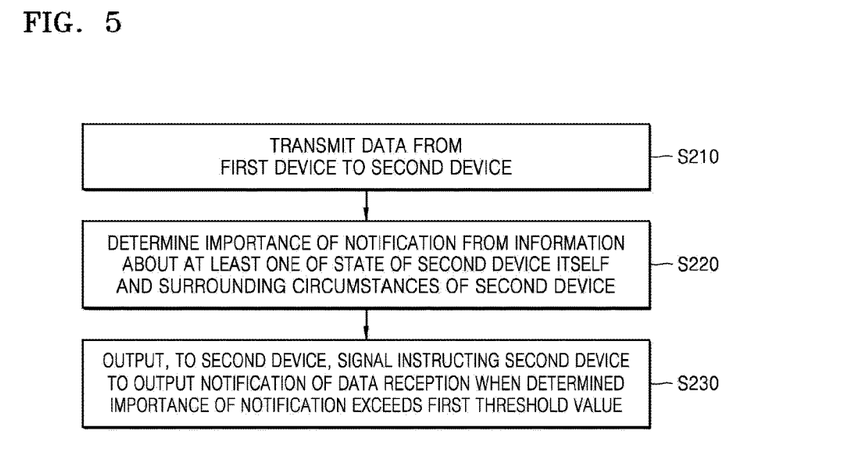

FIGS. 4 and 5 are flowcharts of methods of notifying data reception, according to some example embodiments.

The flowcharts of FIGS. 4 and 5 may include operations processed in time series by the data reception notification device 500 of FIG. 2 or the data reception notification device 510 of FIG. 3. Therefore, even though omitted below, the descriptions provided with reference to the configuration of FIG. 2 or 3 may be applied to the flowcharts of FIGS. 4 and 5.

Referring to FIG. 4, the method of notifying data reception, according to some example embodiments, may include operation S110 of receiving data from an external device, operation S120 of recognizing at least one of a state of the device itself and surrounding circumstances of the device, and determining an importance of notification, and operation S130 of outputting the notification of the data reception when the determined importance of the notification exceeds a first threshold value.

Operation S120 of determining the importance of the notification may include determining basic importance of the data based on at least one of the data itself and the external device having transmitted the data, and recognizing at least one of the state of the device itself and the surrounding circumstances of the device and determining the importance of the notification by correcting the basic importance based on the recognized state of the device or the recognized surrounding circumstances of the device.

Referring to FIG. 5, a method of notifying data reception, according to another example embodiment, may include operation S210 of transmitting data from a first device to a second device, operation S220 of determining an importance of notification from information about at least one of a state of the second device itself and surrounding circumstances of the second device, and operation S230 of outputting, to the second device, a signal instructing the second device to output the notification of the data reception when the determined importance of the notification exceeds a first threshold value.

Operation S220 of determining the importance of the notification may include determining basic importance of the data based on at least one of the data itself and the first device having transmitted the data, and receiving, from the second device, information about at least one of the state of the second device itself and the surrounding circumstances of the second device and determining the importance of the notification by correcting the basic importance based on the received state of the second device or the recognized surrounding circumstances of the second device.

Figure 6:
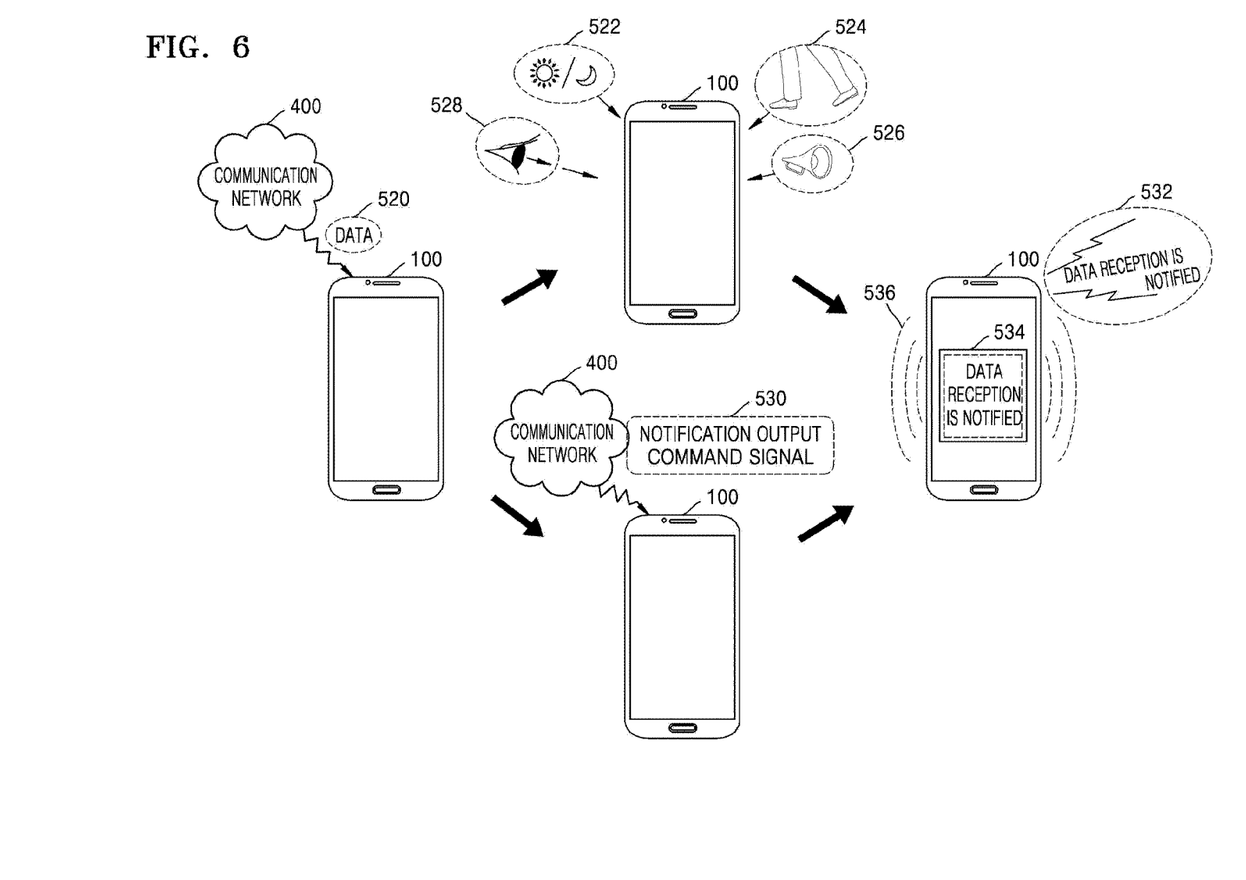
FIG. 6 is a diagram for describing a method of outputting notification of data reception by using the method of notifying data reception, according to an example embodiment.

FIG. 6 describes a method of outputting the notification of the data reception by using the method of notifying data reception, according to an example embodiment.

Referring to FIG. 6, when the first data transmission/reception device 100 receives data via the communication network 400, the first data transmission/reception device 100 may output the notification of the data reception according to the method of notifying data reception.

As illustrated in FIG. 6, the first data transmission/reception device 100 may receive data 520 via the communication network 400.

As illustrated in FIG. 6, when the data reception notification device 500 according to some example embodiments is included in the first data transmission/reception device 100, the data reception notification device 500 may determine the importance of the notification based on the state or the surrounding circumstances of the first data transmission/reception device 100. For example, the data reception notification device 500 may acquire information about illuminance 522 around the first data transmission/reception device 100, shaking 524 of the first data transmission/reception device 100, a sound 526 around the first data transmission/reception device 100, or a line of sight 528 of a user with respect to the first data transmission/reception device 100 by using various types of measurement devices included in, for example, the data reception notification device 500 or the first data transmission/reception device 100. Then, the data reception notification device 500 may determine the importance of the notification of the data reception based on the acquired information.

As illustrated in FIG. 6, when the data reception notification device 500 according to the example embodiment is included in the server 300, the data reception notification device 500 may transmit a notification output command signal 530 to the first data transmission/reception device 100 via the communication network 400. For example, the data reception notification device 500 included in the server may receive, from the first data transmission/reception device 100, the state of the first data transmission/reception device 100 itself or the surrounding circumstances of the first data transmission/reception device 100. Then, the data reception notification device 500 may determine the importance of the notification of the data reception based on the received information. The data reception notification device 500 may transmit the generated notification output command signal 530 to the first data transmission/reception device 100 based on the importance of the notification. The notification output command signal 530 may include information about the importance itself of the notification and may include information about the output strength of the notification, the output frequency of the notification, and/or the notification output method, which are determined based on the importance of the notification.

As illustrated in FIG. 6, after the importance of the notification is determined, the data reception notification device 500 may compare the importance of the notification with at least one threshold value and determine the strength of the notification, the frequency of the notification, and/or the type of the notification, which is to be output by the first data transmission/reception device 100. For example, the type of the notification to be output may include a notification 532 of data reception via a sound, a notification 534 of data reception via a visual sign, and/or a notification 536 of data reception via a vibration. As the importance of the notification is higher, the data reception notification device 500 may increase, for example, the output strength of the notification and/or the output frequency of the notification. For example, the data reception notification device 500 may change the type of the notification to be output, based on the importance of the notification.

In a method of notifying data reception and/or a non-transitory computer-readable medium storing the computer program, which when executed by a computer, is configured to perform the method according to the example embodiments of the inventive concepts, when data is transmitted and received between the devices, the device having received the data may output the notification of the data reception. Further, when data is transmitted and received between the devices, it is possible to determine the importance of the data reception, taking into consideration the device itself that have received the data and/or the surrounding circumstances of the corresponding device, and to determine whether to output the notification of the data reception, the notification method, or the like according to the determined importance of the notification. Furthermore, when data is transmitted and received between the devices, it is possible to determine the importance of the data reception, taking into consideration of the characteristics of the data itself or the state of the device having transmitted the corresponding data, and to determine whether to output the notification of the data reception, the notification method, or the like according to the determined importance of the notification.

According to the one or more example embodiments, methods and/or non-transitory computer-readable mediums storing computer program for notifying data reception of a device, which has received data exchanged (e.g., transmitted and/or received) data between devices, may be provided.

Further, methods and/or non-transitory computer-readable mediums storing computer program for notifying data reception may be capable of determining an importance of notification of the data reception, may take into consideration a device itself having received data or surrounding circumstances of the corresponding device when the data is transmitted and received between the devices, and may determine whether to output the notification of the data reception, an output method, or the like according to the determined importance of the notification, may be provided.

Still further, methods and/or non-transitory computer-readable mediums storing computer program for notifying data reception, may be capable of determining an importance of notification of the data reception, may take into consideration data itself or a state of a device that has transmitted the corresponding data, surrounding circumstances of the corresponding device when the data is transmitted and received between the devices, and may determine whether to output the notification of the data reception, an output method, or the like according to the determined importance of the notification may be provided.

The foregoing example embodiments may be realized by hardware elements, at least one processing circuitry, at least one processing unit, software elements, and/or combinations thereof. For example, the devices and components illustrated in the example embodiments of the inventive concepts may be implemented by processing circuitry such as a computer, a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or more software applications running on the OS. Further, the processing unit may access, store, manipulate, process, and generate data in response to execution of software. It will be understood by those skilled in the art that although a single processing circuitry may include a plurality of processing elements and/or a plurality of types of processing elements. For example, the processing unit may include a plurality of processors or one processor and one controller. Alternatively, the processing unit may have a different processing configuration, for example, a parallel processor.

The example embodiments set forth herein may be embodied as program instructions that can be executed by various processing circuitry and/or recorded on a computer-readable recording medium. Examples of the computer-readable recording medium include a magnetic medium (such as a hard disc, a floppy disk, and a magnetic tape), an optical medium (such as a compact disc (CD)-read-only memory (ROM) and a digital versatile memory (DVD)), a magneto-optical medium (such as a floptical disk), and a hardware device specially configured to store and execute program instructions (e.g., a ROM, a random access memory (RAM), a flash memory, etc.). The medium includes intangible medium embodied in a form transmittable on a network. For example, the medium may be embodied in a software or application form and be transmitted and distributed via a network. The described hardware devices may be configured to as one or more modules or units to perform the operations of the above-described example embodiments of the inventive concepts.

Software elements may include computer programs, codes, instructions or one or more combinations thereof and configure a processing unit to operate in a desired manner or independently or collectively control the processing unit. Software elements and/or data may be permanently or temporarily embodied in any type of machine, components, physical equipment, virtual equipment, computer storage media or units or transmitted signal waves to be interpreted by the processing unit or to provide instructions or data to the processing unit. Software elements may be dispersed throughout computer systems connected via networks and be stored or executed in a dispersion manner. Software elements and/or data may be recorded in one or more computer-readable storage media.

Computer programs may be specifically designed and configured for the inventive concepts, or may be well known to and usable by one of ordinary skill in the field of computer software. Examples of the computer programs include not only machine language codes prepared by a compiler but also high-level codes executable by a computer by using an interpreter.

The example embodiments set forth herein are merely examples and are not intended to limit the scope of the inventive concepts. For clarity, other functional aspects of the existing electronic structures, control systems, software, and systems may not be described herein. Also, lines or connecting members that connect components illustrated in the drawings are merely used to represent functional connection and/or physical or circuit connections, and thus may be replaced with other elements or used to represent additional various other functional connections, physical connection, or circuit connections when the inventive concepts are applied to an actual apparatus. Also, components illustrated in the drawings may be omitted unless they are particularly stated using expressions such as "necessary" or "important".

It should be understood that example embodiments described herein should be considered in a descriptive sense only and not for purposes of limitation. Descriptions of features or aspects within each example embodiment should typically be considered as available for other similar features or aspects in other example embodiments.

While one or more example embodiments have been described with reference to the figures, it will be understood by those of ordinary skill in the art that various changes in form and details may be made therein without departing from the spirit and scope of the inventive concepts as defined by the following claims.

What is claimed is:

1. A method of outputting notification of data reception in a device, which is configured to transmit and receive data to and from an external device, the method comprising:
   receiving, by a processor of the device, data from the external device;
   determining, by the processor of the device, an importance of notification by recognizing at least one of a state of the device or surrounding circumstances of the device; and outputting, by the processor of the device, the notification of the data reception in response to the determined importance of the notification exceeding a first threshold value,
wherein the determining an importance of notification includes,
determining a basic importance of the data based on the data and the external device having transmitted the data,
recognizing the at least one of a state of the device or surrounding circumstances of the device, and
determining the importance of the notification by correcting the basic importance based on the at least one of a state of the device and surrounding circumstances of the device, and
wherein the at least one of a state of the device or surrounding circumstances of the device includes information about illuminance around the device, shaking of the device, a sound around the device, and/or a line of sight of a user with respect to the device, and
wherein the outputting the notification comprises increasing at least one of an output strength of the notification, an output frequency of the notification, or a display region of the notification in proportion to at least one of the determined importance of the notification or a time elapsed from a start time of the notification.

2. The method of claim 1, wherein the determining an importance of notification comprises:
detecting a user's input to the device; and
determining the importance of the notification taking into consideration a type of the detected user's input,
wherein the type of the detected user's input includes at least one selected from among an input of checking the notification and disabling a display of the device, an input of disabling a sound output of the device, an input of disabling a vibration of the device, and an input of initializing the device.

3. The method of claim 2, wherein the determining an importance of notification determines the importance of the notification based on the user's input to the processor of the device that is detected while the device is in a locked state, and the locked state is a state in which the device is disabled for at least one of receivable inputs.

4. The method of claim 1, wherein the determining a basic importance determines the basic importance based on at least one selected from
a time elapsed after a recent data reception from the external device,
an average elapsed time from a time point of a data reception from the external device to a time point of a data transmission to the external device,
whether the data is transmitted and received between the device and the external device during a first reference period, and
a ratio of a number of data transmissions to the external device with respect to a sum of the number of data transmissions to the external device and a number of data receptions from the external device.

5. The method of claim 1, wherein the determining an importance of notification comprises:
measuring the illuminance around the device; and
determining that the importance of the notification is higher as the measured illuminance around the device becomes lower.

6. The method of claim 1, wherein the determining an importance of notification comprises:
measuring a degree of the shaking of the device; and
determining that the importance of the notification is higher as the measured degree of the shaking of the device becomes higher.

7. The method of claim 1, wherein the determining an importance of notification comprises:
checking whether a user watches the device; and
determining that the importance of the notification is lower in response to the user watching the device.

8. The method of claim 1, wherein the outputting the notification comprises:
determining at least one type of the notification to be output according to whether the determined importance of the notification exceeds a second threshold value; and
outputting the determined type of the notification,
wherein the type of the notification includes at least one selected from a notification via a sound, a notification via a vibration, and a notification using a method of displaying a visual sign on an entirety of or a portion of a display region of the device.

9. A method of outputting notification of reception of data, which is transmitted and received between first and second devices through a server which is configured to store, transmit, or receive the data, the method comprising:
transmitting, by a processor of the server, data from the second device to the first device;
determining, by the processor of the server, an importance of notification based on information about at least one of a state of the first device or surrounding circumstances of the first device; and
transmitting, by the processor of the server, a signal instructing the first device to output the notification of reception of the data in response to the determined importance of the notification exceeding a first threshold value,
wherein the determining an importance of notification includes,
determining a basic importance of the data based on the data and the second device having transmitted the data,
receiving, from the first device, information about the at least one of a state of the first device or surrounding circumstances of the first device, and
determining the importance of the notification by correcting the basic importance based on the at least one of a state of the first device or surrounding circumstances of the first device, and
wherein the at least one of a state of the first device or surrounding circumstances of the device includes information about illuminance around the first device, shaking of the first device, a sound around the first device, and/or a line of sight of a user with respect to the first device, and
wherein the transmitting a signal comprises adjusting a notification output signal transmitted to the first device such that at least one of an output strength of the notification, an output frequency of the notification, or a display region of the notification is adjusted in proportion to at least one of the determined importance of the notification or a time elapsed from a start time of the notification.

10. The method of claim 9, wherein
the determining an importance of notification determines the importance of the notification taking into consideration a type of a user input detected by the first device, the type of the detected user input includes at least one selected from among
- an input of checking the notification and disabling a display of the first device,
- an input of disabling a sound output of the first device,
- an input of disabling a vibration of the first device,
- an input of initializing the first device,
- an input of changing the first device to a locked state, and
- an input of checking the notification in response to the first device being in the locked state, and the locked state is a state in which the first device is disabled for at least one of receivable inputs.

11. The method of claim 9, wherein the determining an importance of notification comprises:
- receiving, from the first device, information about at least one of the illuminance around the first device or a degree of shaking of the first device; and
- determining that the importance of the notification is higher as the illuminance around the first device is lower or in response to the degree of shaking of the first device being higher.

12. The method of claim 9, wherein the determining an importance of notification comprises:
- receiving, from the first device, information about whether a user of the first device watches the first device; and
- determining that the importance of the notification is lower in response to the user of the first device watching the first device.

13. The method of claim 9, wherein the transmitting a signal comprises:
- determining at least one type of the notification to be output, according to whether the determined importance of the notification exceeds a second threshold value; and
- transmitting a signal instructing the first device to output the determined type of the notification, and
- wherein the type of the notification includes at least one selected from a notification via a sound, a notification via a vibration, and a notification using a method of displaying a visual sign on an entirety of or a portion of a display region of the first device.

14. A non-transitory computer-readable recording medium storing a computer program, which when executed by a computer, is configured to cause the device to perform the method of claim 1.

* * * * *